(12) United States Patent
Edwards et al.

(10) Patent No.: US 7,542,759 B2
(45) Date of Patent: Jun. 2, 2009

(54) METHOD AND APPARATUS FOR BROADCASTING SOFTWARE UPDATE INFORMATION TO MOBILE PHONES OVER A WIRELESS COMMUNICATIONS NETWORK

(76) Inventors: Bryan T. Edwards, 175 Sould 35th St., Boulder, CO (US) 80305; Gerald R. Colvin, 215 W. Spruce St., Louisville, CO (US) 80027; Christophe Durand, 2942 W. Yarrow Cir., Superior, CO (US) 80027

( * ) Notice: Subject to any disclaimer, the term of this patent is extended or adjusted under 35 U.S.C. 154(b) by 446 days.

(21) Appl. No.: 11/405,932

(22) Filed: Apr. 18, 2006

(65) Prior Publication Data

US 2007/0243900 A1  Oct. 18, 2007

(51) Int. Cl.
*H04M 3/00* (2006.01)

(52) U.S. Cl. .............. 455/419; 717/170; 717/173; 717/175; 717/178; 370/337; 370/345

(58) Field of Classification Search ............... 455/428, 455/509, 425, 426.1, 419, 517, 41.1, 420, 455/418, 3.01, 412.1, 403, 557; 370/260, 370/259, 263, 202.01, 321, 349, 389; 717/140
See application file for complete search history.

(56) References Cited

U.S. PATENT DOCUMENTS

| | | | | |
|---|---|---|---|---|
| 4,009,347 A * | 2/1977 | Flemming et al. | ........... | 370/321 |
| 5,887,254 A * | 3/1999 | Halonen | ............ | 455/419 |
| 6,128,509 A * | 10/2000 | Veijola et al. | ............ | 455/556.1 |
| 6,622,017 B1 * | 9/2003 | Hoffman | ............ | 455/419 |
| 6,826,159 B1 * | 11/2004 | Shaffer et al. | ............ | 370/260 |
| 6,842,861 B1 * | 1/2005 | Cox et al. | ............ | 713/188 |
| 6,961,537 B2 * | 11/2005 | Rajaram | ............ | 455/3.01 |
| 7,200,390 B1 * | 4/2007 | Henager et al. | ............ | 455/419 |
| 2003/0067903 A1 * | 4/2003 | Jorgensen | ............ | 370/338 |
| 2003/0110480 A1 * | 6/2003 | Rajaram | ............ | 717/140 |
| 2003/0186694 A1 * | 10/2003 | Sayers et al. | ............ | 455/426.1 |
| 2004/0038675 A1 * | 2/2004 | Criss et al. | ............ | 455/419 |
| 2004/0214561 A1 * | 10/2004 | Date et al. | ............ | 455/418 |
| 2005/0026603 A9 * | 2/2005 | Rajaram | ............ | 455/419 |
| 2005/0059390 A1 * | 3/2005 | Sayers et al. | ............ | 455/425 |
| 2005/0063353 A1 * | 3/2005 | Anderson et al. | ............ | 370/346 |
| 2005/0090246 A1 * | 4/2005 | Leermakers | ............ | 455/428 |
| 2005/0246703 A1 * | 11/2005 | Ahonen | ............ | 717/172 |
| 2005/0275587 A1 * | 12/2005 | Siegel et al. | ............ | 342/357.06 |
| 2006/0019664 A1 * | 1/2006 | Nelakanti et al. | ............ | 455/436 |
| 2006/0063519 A1 * | 3/2006 | Rajaram | ............ | 455/419 |
| 2008/0059958 A1 * | 3/2008 | Bolanowski | ............ | 717/168 |

\* cited by examiner

*Primary Examiner*—Rafael Pérez-Gutiérrez
*Assistant Examiner*—Joseph Arevalo
(74) *Attorney, Agent, or Firm*—Robert Schuler

(57) ABSTRACT

A local area wireless communications network includes an MCU which generally operates to manage the placement of audio and other information into frames that are transmitted to a base station which serves to convert the frames from one signal format to another signal format and broadcast the frames over a wireless medium to associated mobile communications devices. The wireless communications system operates in a way that permits the broadcasting of new software files from the base stations to associated mobile communications devices in a parallel manner without having a detrimental affect on the operation of the communications system. The MCU operates to place download alert information and download payload information into the frames in such a format and into certain positions in the frame that this information can be recognized and stored by the mobile phones which use it to update their current software.

20 Claims, 10 Drawing Sheets

METHOD AND APPARATUS FOR BROADCASTING SOFTWARE UPDATE INFORMATION TO MOBILE PHONES OVER A WIRELESS COMMUNICATIONS NETWORK

BACKGROUND

Mobile communications devices, such as mobile phones, incorporate a telephone application that can be implemented in hardware, firmware or software and the telephony application has typically been programmed into a non-volatile type memory at the factory and not easily modified when in the field. If it became necessary to modify the telephony application in the field to fix a bug or to simply update the application to a more recent version, it was necessary to have a field service technician visit the wireless telephone system site to change the memory device or reload the modified software.

A method for broadcasting software applications stored at a server to multiple, portable data communications devices is disclosed in U.S. application no. 2005/0090246. This application discloses a method for transmitting, upon request by the communications device, each of several different software applications on different frequencies. The portable data communications device can then access the software applications on the server by sending certain client data which causes the server to respond by sending the software application over a particular frequency. The communications device can be selectively set to receive the software file on this transmission frequency.

A method for updating the software in a cellular phone is described in U.S. application no. 2005/0170827. This application discloses a cellular phone that when docked on a battery charger, sends a message to a management station, which stores update software files, requesting that the latest version of the software be transmitted to it.

Other methods are well known for multicasting software update information over a wired network to multiple client terminals. And examples of such methods are disclosed in U.S. patent application nos. 2003/0028899 and 2002/0075824.

In light of the limitations of the prior art attempts to update mobile phone software, it would be advantageous if a wireless telephone system could perform over-the-air software updates to two or more mobile phones at the same time without degrading the performance of the wireless telephone system and without operator intervention. It would be advantageous to be able to perform over-the-air software updates to two or more mobile phones at the same time, while some phone are in call mode and while some other phones are turned off or in the sleep mode of operation. It would be advantageous to be able to perform over-the-air software updates to two or more mobile phones at the same time without the need for a system administrator to collect and update the phones.

These above mentioned advantages are realized by broadcasting fragments of a new software file version continuously in free TDMA time slots to all mobile phones associated with base stations in the wireless telephone system. Each fragment has an address into phone memory in which it should be stored and each frame broadcast contains a ring channel that carries the S/W version # and total size of the download file. All phones do not have to receive the same download information at the same time, but over time they all do and ultimately the phone receives the entire download file. At this point, the phone takes itself out of service, erases its memory, and copies the downloaded software into memory and then places itself back into service.

BRIEF DESCRIPTION OF THE DRAWINGS

FIG. 10b is a continuation of the logical flow diagram of FIG. 10a.

SUMMARY OF INVENTION

The limitations of the prior art are overcome by our invention which is implemented in a wireless communications network that includes an MCU, a base station and a plurality of mobile communications devices associated with the base station. Our invention provides for a novel method of replacing a software file currently being utilized by a mobile communications device with a new software file and comprises a number of steps including the step of the MCU placing broadcast download alert information into an at least partially idle time slot, placing broadcast download payload information into a completely idle time slot, transmitting a frame containing the partially idle and completely idle time slots to the base station, the base station receiving the frame from the MCU and broadcasting it to all of the mobile communications devices associated with it, at least one mobile communications device receives the frame and compares a new file version alert characteristic contained in the frame with a current file version characteristic stored in one of the memories on the mobile communications device, the mobile communications device stores a new software file fragment in another memory at a location specified by an address characteristic if the new file version alert characteristic and the current file version characteristic are not the same, the mobile communications device comparing the new file size to the expected new file size, and if they are the same, going out of service to delete the current software file and replace it with the new software file and then going back into service.

DETAILED DESCRIPTION OF THE INVENTION

Figure 1:
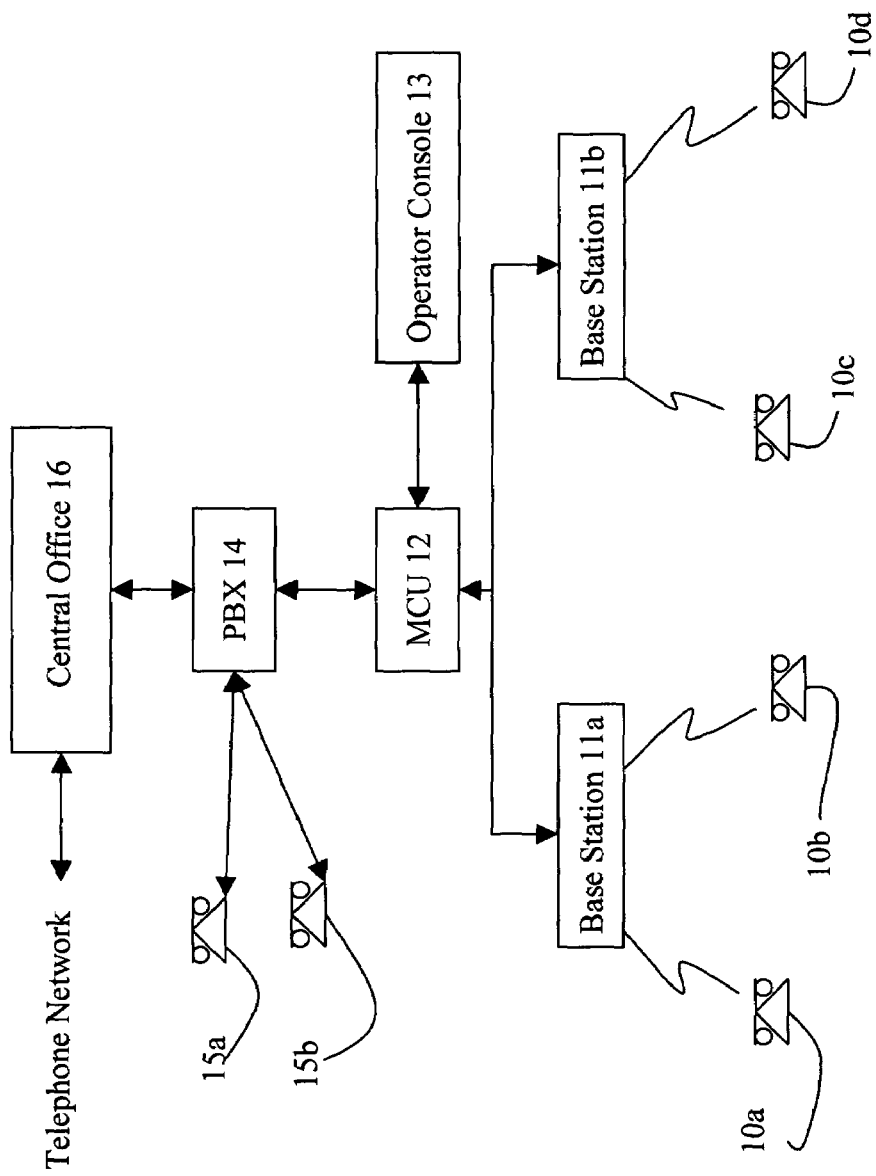
FIG. 1 is a high level functional block diagram of a wireless telephone system of the invention.

FIG. 1 is a high level functional block diagram of a wireless telephone system including a PBX and Central Office switch. Specifically, the wireless telephone system includes mobile phones 10a, 10b, 10c & 10d, base stations 11a and 11b, a Master Control Unit (MCU) 12, an operator's console 13, a PBX 14 with associated desk phones 15a and 15b, and a central office switch 16. The mobile phones are full-duplex phones capable of making and receiving calls with all the functionality of a wired desk phone, they utilize spread spectrum, frequency hopping transmission technology in the 902 to 928 MHz frequency band and transmit and receive frames of audio and/or data information formatted according to the well known TDMA/TDD channelization technology. The mobile phones transmit to and receive frames of information from one or more base stations which can transmit to and receive frames from an MCU. The mobile phones are designed so that during an active call, an established communication link is not lost as the user changes position or roams from one location to another. As the user roams with the mobile phone, it is likely that the signal strength from the current base station will change, and if it drops below a particular threshold, the mobile phone will start searching for another base station with a stronger signal. This process of searching for the strongest signal is call dynamic channel allocation or DCA.

Base stations 11*a* and 11*b* generally function to receive frames from MCU 12 over a transmission line that operates according to the well known EIA-422 serial data communications protocol, converts this information into frames according to the TDMA frame format, and uses frequency hopping, spread spectrum technology to transmit the formatted TDMA frames of information over the wireless medium to the mobile phones. The base stations also facilitate the synchronization process with the mobile phones which is necessary due to differing signal propagation times. MCU 12 generally functions to control the operation of the wireless telephone system to include managing the routing of information between the mobile phones, base stations and PBX, coordinating and synchronizing the operation of the base stations, generating instructions that are sent to the base stations to control their operation either to establish or disconnect a call to or from a mobile phone, and to manage the roaming/handoff procedure. The MCU can communicate with the PBX utilizing any one of a number of proprietary or non-proprietary digital signal protocols. An example of a non-proprietary protocol is Basic Rate ISDN (BRI). The MCU may also be able to communicate using a standard analog signal protocol. The operator console 13 is generally utilized by a system manager to monitor the operation of the wireless telephone system, trouble-shoot system problems, and to develop/store updated versions of software to be loaded onto the MCU. The operator console communicates directly with the MCU using the RS-232 standard. The PBX operates primarily as a switch to receive call information from the wireless telephone system and send it to either the desk phones or to the central office or to receive call information from the central office and send it to the desk phones or to the wireless telephone system. The central office switch operates as the interface between the PBX and the PSTN network.

Figure 2:
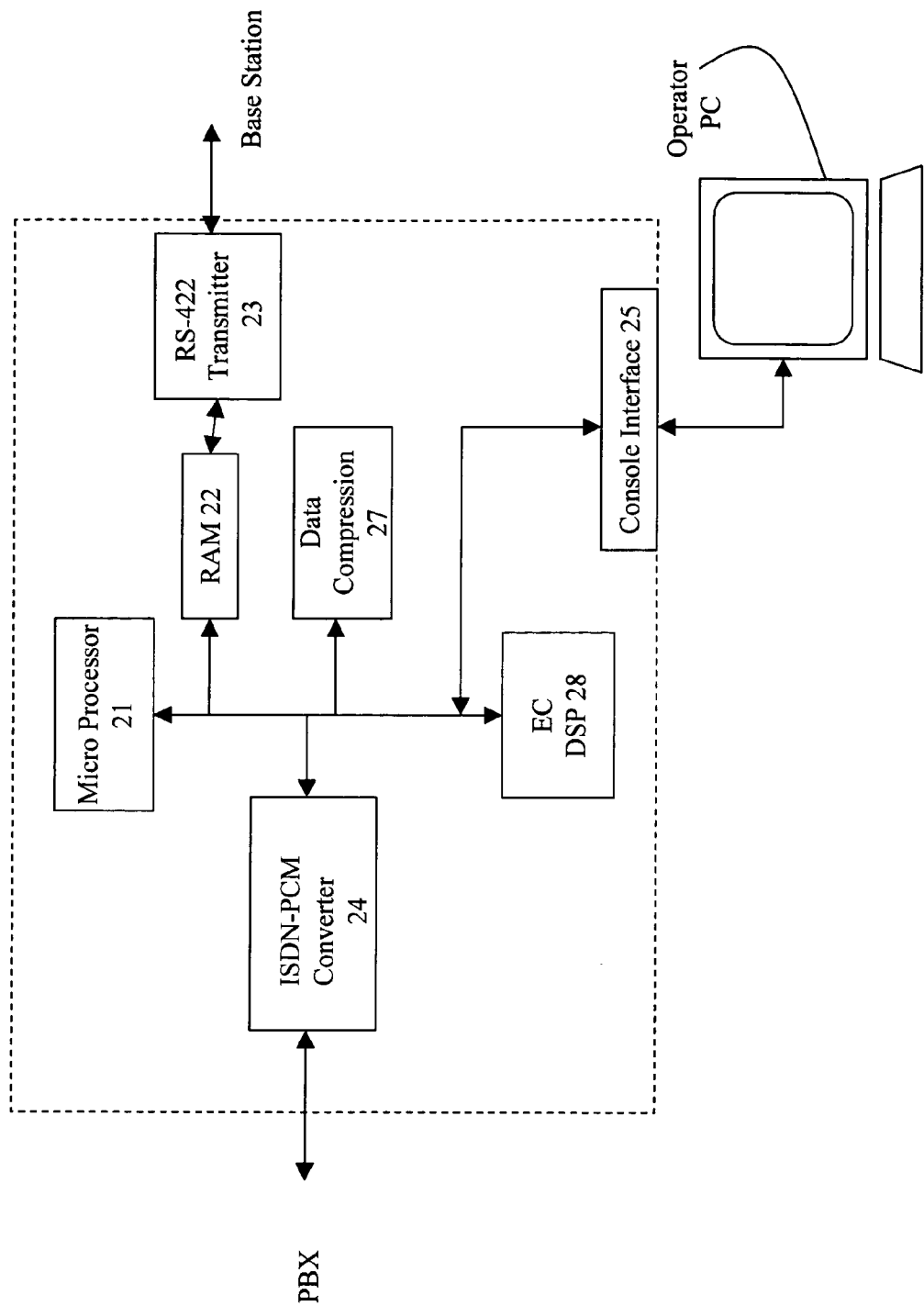
FIG. 2 is a high level functional block diagram of an MCU.

FIG. 2 is a high level functional block diagram of the MCU 12. As mentioned previously, the MCU functions to control the overall operation of the wireless telephone system and is comprised of a processor 21, which in this case is an Intel 80186 25 MHz processor, that utilizes control logic (residing in the processor) to effectively manage the flow of audio and control information through the MCU. The MCU also includes a memory 22, which in this case is RAM with at least 128K of memory, that is generally used to store audio and control information received from either the PBX or the base stations and for storing new software file versions, hereinafter referred to as a new file, to be downloaded to the mobile phones. The MCU also includes an operator console interface 25, an ISDN to PCM converter 24 that converts ISDN signals into PCM data and control signals on bus 26, an RS422 transmitter 23, that transmits RS422 signals according to the requirements of processor bus 27, an echo canceller 28 and it includes a data compressor 27. The operation and design of operator interface 25, ISDN to PCM converter 24, RS422 transmitter 23, data compressor 27, and echo canceller 28 are all well know and are not essential to the understanding of our invention and so will not be discussed here in great detail. The processor, memory, data compressor, echo canceller, console interface, and converter all communicate over processor bus 26 which in this case is the Intel 80186 processor bus.

Continuing to refer to the MCU 12 of FIG. 2, a serial stream of digital audio and control information is sent from the PBX over the ISDN lines to the MCU where at converter 24 the serial information is converted into parallel words of audio and control information. The converter 24 sends the audio information to an echo cancellation device 28 and the control information to the processor 21. The echo cancellation device 28 converts the PCM audio information into ADPCM (adaptive differential PCM) audio information using well known methods. The results of the data compression operation are then stored in memory 22. The processor uses the control information, sent to it by the converter 24 to, among other things, generate radio and communications channel op codes and to assign traffic to time slots. The processor stores these op codes and communications traffic in memory 22 along with the associated audio information where it is available to be read by the RS422 transmitter 23 and formatted into a 10 ms frame of information for transmission to the base stations 11*a* or 11*b*. The frame format generated by the MCU for transmission to the base station is almost the same frame format as that transmitted by the base station to the mobile phones with the exception of frequency hopping information and bit sync data.

The MCU transmits this frame of information to one of the base stations at 10 ms intervals. Each 10 ms frame contains eight 1.25 ms time slots and one mobile phone has access to only one pair of these time slots per frame. The format and function of each time slot will be discussed later with reference to FIG. 5 and FIG. 6. As the available bandwidth in the wireless telephone system of FIG. 1 is seldom fully utilized, unused bandwidth capacity in the form of free time slots is frequently available to the mobile phones to conduct management functionality such as the dynamic channel allocation process or, as in the case of our invention, for the base station to broadcast a new version of a software file to the mobile phones. The MCU can utilize these idle time slots to transmit broadcast download payload information, consisting of address information, fragments of a new software file, and CRC information, to the base stations which in turn can broadcast this information to the mobile phones. Specifically, upon recognizing that there is at least one free TS the processor 21 will place broadcast download payload information into memory 22 where it can be used by the transmitter 23 to format the header and body of the idle time slot which will then be transmitted in a frame of information to the mobile phone. We will discuss the method of our invention in greater detail later with reference to FIG. 8.

Figure 3:
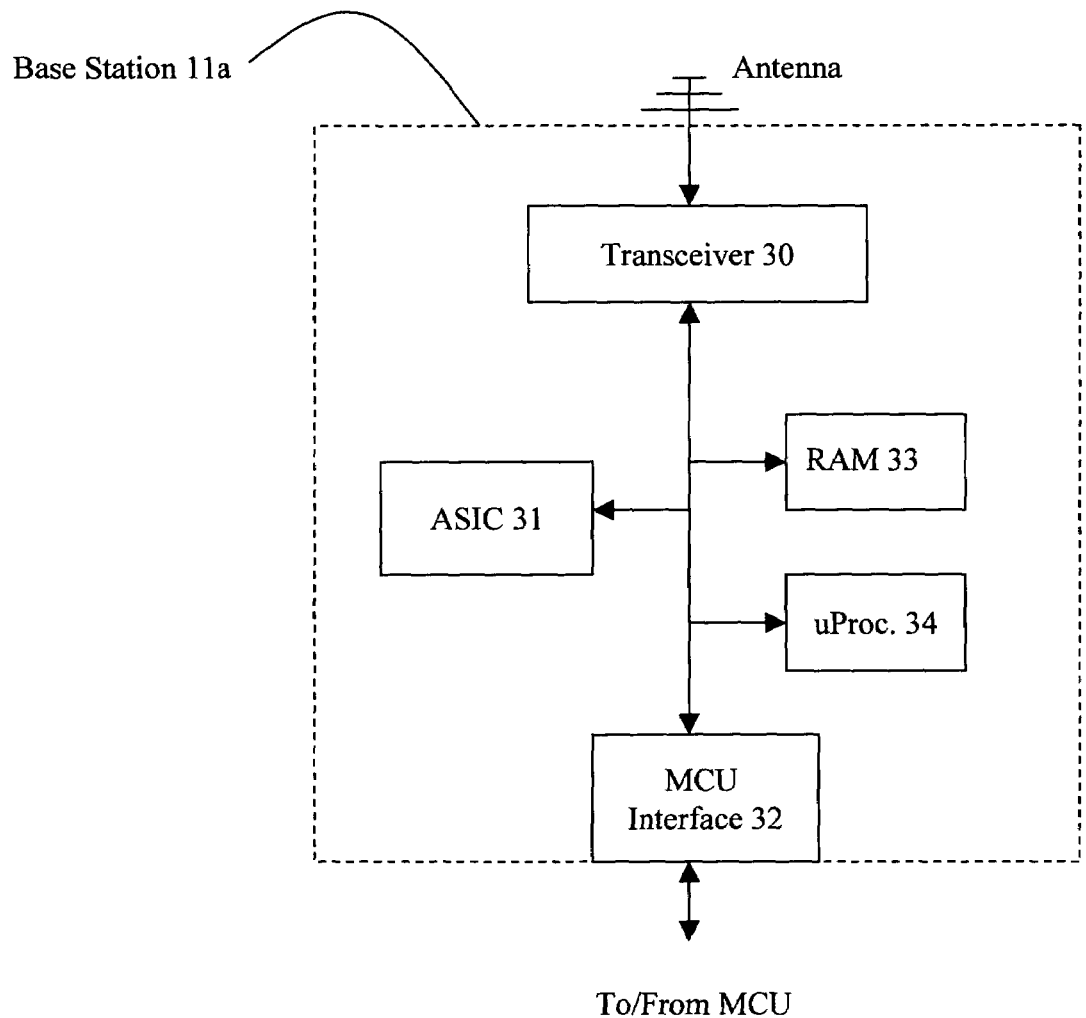
FIG. 3 is a high level functional block diagram of a base station.

Turning now to FIG. 3, we will describe the structure and operation of one of the base stations 11*a* or 11*b*. A base station 11*a*, for instance, receives the 10 ms frames of audio and control information from the MCU 12 at the MCU interface 32 and temporarily stores the frame in memory 33, which can be RAM. After the ASIC 31 strips the control information from the frame stored in memory and replaces the striped information with frequency jump and bit synchronization data, the transceiver 30 modulates the frame and broadcasts it as a radio frequency signal over the wireless medium to all of the mobile phones 10a, 10b, 10c or 10d. As mentioned above, the ASIC 31 operates to strip the commands inserted into the frames at the time they were sent by the MCU and replaces them with frequency jump and bit synchronization data. The ASIC also serves to cooperate with the mobile phones to run a synchronization routine. Software running in the micro processor 34 configures and manages the operation of ASIC 33. Routines used to synchronize mobile phones to base stations are well known to those skilled in the art of TDMA wireless communications systems and furthermore, a detailed understanding of the operation of this routine is not necessary to understanding of our invention. The microprocessor 34 functions to generally control the operation of the ASIC.

Figure 4:
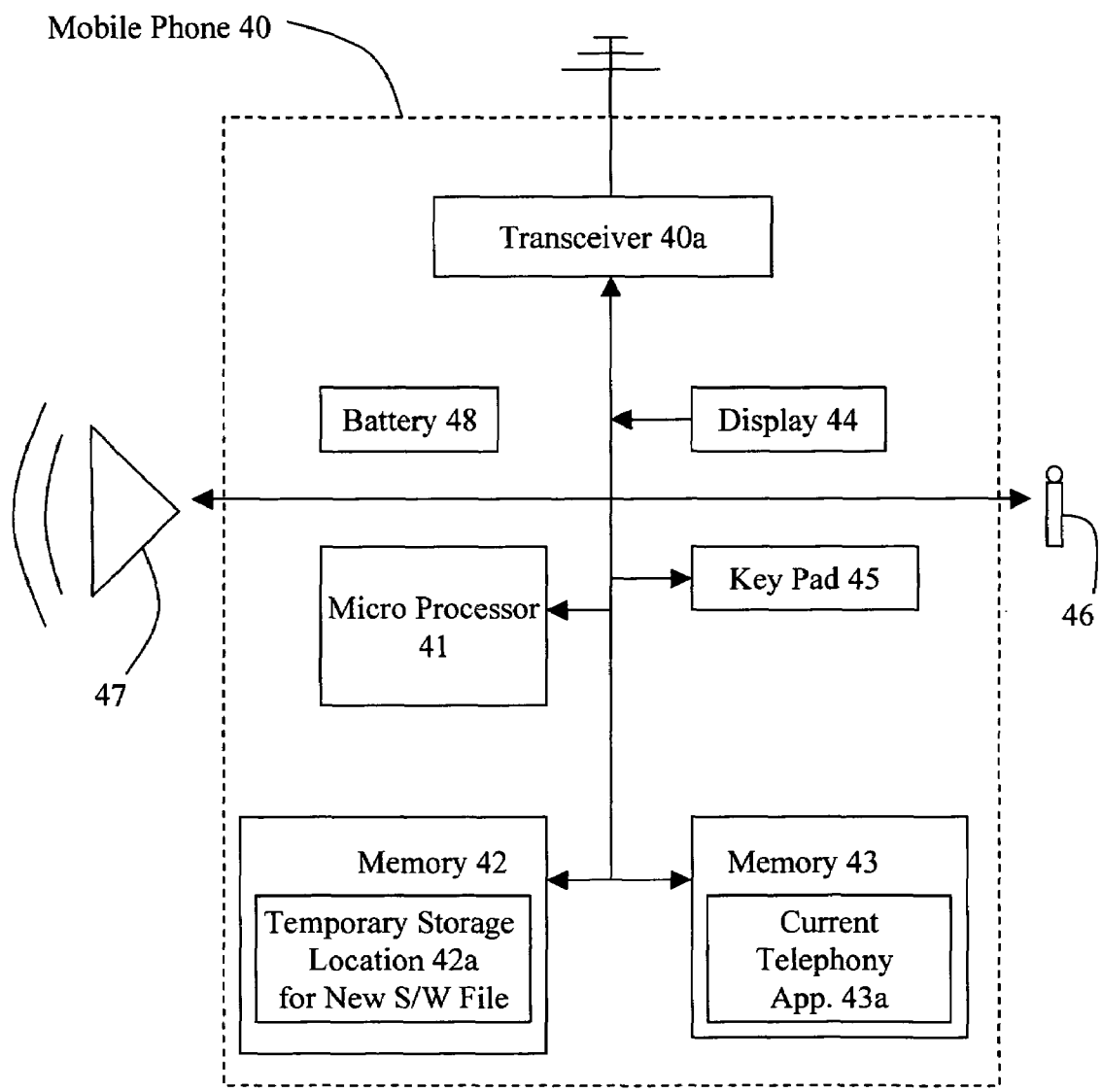
FIG. 4 is a high level functional block diagram of a mobile phone.

Referring now to FIG. 4, we will describe the structure and operation of a mobile phone as it relates to our invention. Transceiver 40 receives the radio frequency signal transmitted by the base station, as previously described with reference to FIG. 3, and demodulates the signal which has the effect of converting it back into the 10 ms frame format. Processor 41 generally functions to operate using the instructions contained in the telephony application 43a stored in memory 43 to examine the frame of information sent by the base station. Provided the frame contains audio or data information directed to the mobile phone, then processor 41 examines this information and depending upon certain information (radio or communication channel op code) contained in the frame or TS header sends instructions, data and/or the audio information to either the speaker 47, to the display 44, to memory 42 or memory 43. In this case the data could be broadcast download payload information containing, among other things, a new software file fragment that the processor would send to memory 42 for temporary storage. At the point that all of the new software file fragments have been loaded into memory 42 they constitute a complete new software file. Memory 43 as mentioned above, is used to store, among other things, the current telephony application 43a, or simply the current software file 43a, that is used by the processor 41 to run the mobile phone functions. The current file 43a contains, among other things, a current file version characteristic which can be simply a current file version number, for instance. For the purposes of our invention, it is convenient to implement memory 43 as an EEPROM otherwise referred to as flash memory, but other memory technology could be used. RAM 42 is used for, among other things, the temporary storage of data received in idle TSs sent to the mobile phone in frames broadcast by the base station. For the purpose of describing our invention, this data can be a new software file fragment. Battery 48 is shown in this figure merely to indicate that it is used to provide power to the various mobile phone components.

Figure 5:
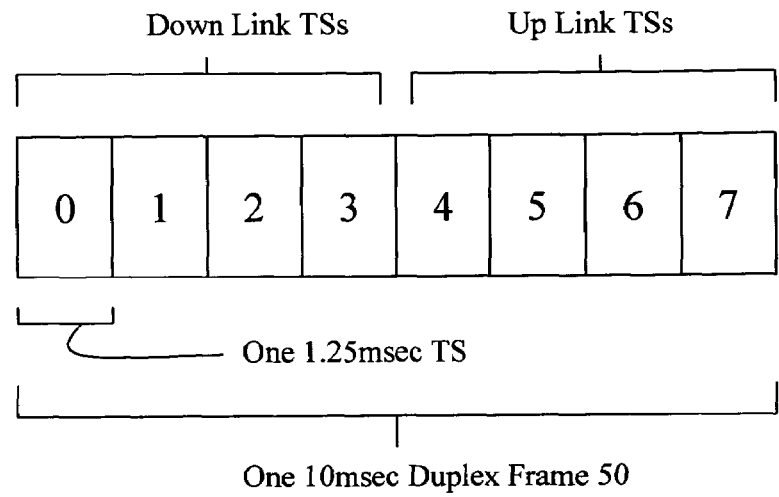
FIG. 5 illustrates the time slot format in a duplex frame of information.
Figure 6:
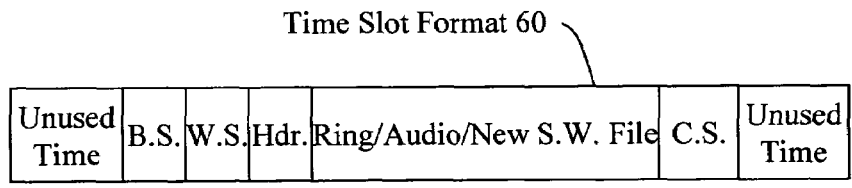
FIG. 6 illustrates the format of a regular time slot.

As mentioned previously with reference to FIG. 1, the mobile phones 10a, b, c, & d can all operate in full-duplex mode and transmit and receive duplex frames of information formatted according to the well know TDMA/TDD channelization technology. As illustrated in FIG. 5, one 10 ms duplex frame is composed of eight 1.25 ms time slots 0-7 (TS). Four time slots, TS 0-3, are dedicated to downlink traffic (from the BS to the Phone) and four time slots, TS 4-7) are dedicated to uplink traffic with each active phone using one pair of slots (0 & 4, 1 & 5, etc.). Specifically, with reference to FIG. 6, time slot 60 starts with free air time of fixed duration followed by radio setup time, synchronization information, followed by header information, followed by data (control information, voice, ring or update software increment for instance), followed by a checksum and then a gap which allows the phone to try to calibrate itself by adjusting its frequencies to match the base station.

Figure 7:
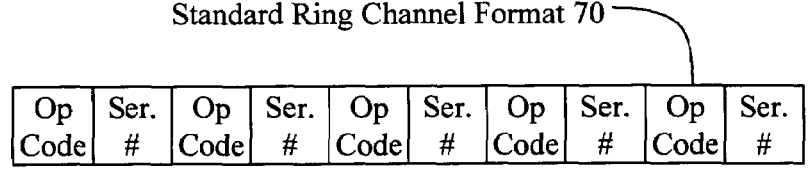
FIG. 7 illustrates the standard ring channel format.
Figure 8:
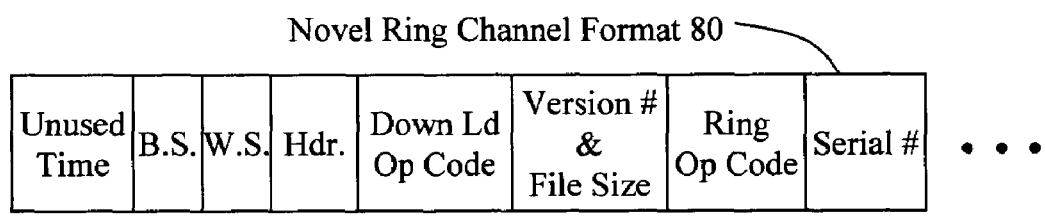
FIG. 8 illustrates the format for a time slot alerting mobile phones of a new file version.

As mentioned above and with reference now to FIG. 7, a time slot, TS zero in this case, can be used to carry ring information that will be referred to in this application as a ring channel. This ring information includes a ring op code and the mobile phone serial number being alerted to ring. TS zero can be used to alert up to five phones to ring and so can be thought of as having five ring channels. Typically, not more than a few phones are alerted to ring at the same time and so there can be unused or idle ring channels available to be utilized, for among other things, to alert the phones that there is a new software file being downloaded in idle TSs and we will hereinafter refer to a TS used to alert the phones that download information is contained in the frame as alert TSs. Regardless of whether there is free time in the ring channel or not, download alert information will be written into the alert TS as necessary by simply overwriting any existing ring information. FIG. 8 illustrates a novel ring channel format employed in TS zero to alert mobile phones that a new software file is available for downloading. In this novel format, the ring op code is replaced with a new download op code, which is used by the telephony application 43a of FIG. 4 to process other information included in the TS, and the mobile phone serial number is replaced with the new software file version number and the total size of the new file. Subsequent completely idle TSs can be used to transmit new software file fragments. By completely idle TS we are referring to a TS that has no payload information, i.e., it carries no audio, data, or control information, and these TSs could carry null data, for instance. Specifically, and in accordance with the preferred embodiment of our invention, at least one TS zero or alert TS in every fifth frame of information broadcast from a base station to the mobile phones carries the above download op code, version & file size information which we will refer to as broadcast download alert information and we will refer to the broadcast download op code, new software file version number and file size as alert characteristics. However, the method of our invention is not limited to how frequently or infrequently this broadcast download alert information is included in TS zero. Regardless of the frequency with which the broadcast download alert information is incorporated in a TS zero, all completely idle timeslots, including an idle TS zero, can be loaded with broadcast download payload information containing, among other things, new software file fragments and broadcast by one or more base stations to associated mobile phones. In accordance with the preferred embodiment of our invention, if a frame of information includes broadcast download payload information it is preceded, in the frame by a broadcast download alert TS. Alternatively, the broadcast download alert information and the broadcast download payload information could be contained in the same completely idle TS.

Figure 9:
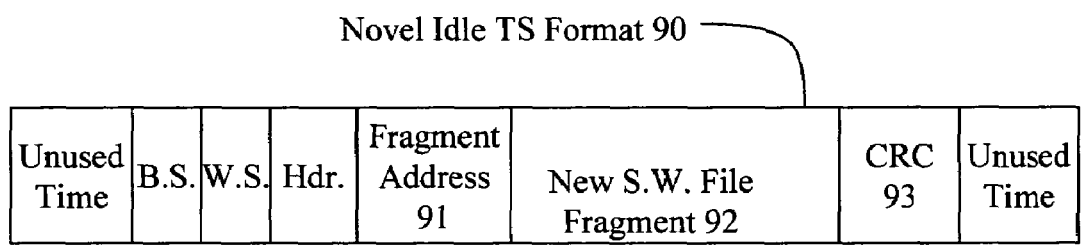
FIG. 9 illustrates the format of an idle TS with an incremental portion of a new file.

FIG. 9 is an illustration showing an idle TS format used to transmit broadcast download information which is comprised of a set of characteristic elements such as an address characteristic and a file accuracy characteristic. The first field in the TS includes the same information as contained in the regular TS described with reference to FIG. 6. A fragment address 91 contains the address in mobile phone memory 42 where the new software file fragment is temporarily stored. It should be understood that a new software file to be loaded onto the mobile phone is typically too large to be transmitted by the base station to the mobile phone in a single idle TS, but if it is the case that this is possible, then every idle TS could contain exactly the same data. Much more typically, the new software file to be downloaded onto the phones contains hundreds of kilobytes or Megabytes of information. In this event, the file can be divided into fragments of equal size. So, for instance, if the new software file is one hundred kilobytes in length, and each fragment contains 20 bytes of information, the file could be divided into five thousand one hundred twenty fragments of 20 bytes each. A different fragment address 91 is associated with each of the 5120 new software file fragments. Further, these fragment addresses are assigned to each new file fragment in a sequential manner or more specifically, each 20 byte new file fragment is assigned a starting address in mobile phone memory. So if the memory is addressable to individual bytes, the first new file fragment might carry an address of zero or some offset from zero, the second file fragment carries an address of 20 plus any offset, and the third file fragment carries an address of 40 plus any offset and so forth. In addition to the MCU placing a fragment address and a new software file fragment in each idle TS, the MCU also places CRC information into the idle TS format 90 that the mobile phones use to verify that the file fragment has been transmitted accurately or without errors. This CRC can be calculated by the MCU for each file fragment at the time it is placed into the idle TS format or, in the preferred embodiment of our invention, the CRC it can be pre-calculated for each file fragment and stored in a lookup table where it is fetched by the MCU and placed into the idle TS with the proper file fragment at the time a frame containing the idle TS is transmitted to a base station.

Continuing to refer to the TS format 90 of FIG. 9, after the fragment address information, the payload field contains data, which in this case is a new software file fragment 92. This new software file fragment is followed by CRC information 93 which the telephony application uses to verify the accuracy of the downloaded file fragment. The fragment address 91, new software file fragment 92, and CRC 93 together are referred to as a set of broadcast download payload information. The new file fragments are placed into all of the idle TSs in a round robin fashion. Therefore once all of the file fragments are transmitted, the broadcast process returns to the first file fragment and again transmits all of the file fragments in sequential order as before. Although we describe the preferred embodiment as transmitting fragments in sequential order, this is not a limitation of our invention, as the fragments can be transmitted in any order. At times, a mobile phone may be busy in a call or not turned on which could result in the phone not receiving one or more new software file fragments resulting in an incomplete image of the file. This problem is overcome by the wireless telephone system continuously broadcasting the fragments of the new software file to all of the mobile phones in the system until such time that another new software file version is loaded into the MCU. So if a mobile phone is turned on and starts receiving the new file at fragment number 3600 the phone merely has to wait until the round robin broadcasting process returns to new file fragment number one and starts re-broadcasting the new file fragment. Or it may be that the phone receives all but file fragments 1000 to 2000, in which case the phone, if not busy, would receive these and place them into memory at the proper locations. The mobile phone determines that it has received the entire new software file when the size of the file in memory equals the file size that is transmitted with the broadcast download alert information contained in every alert TS as described with reference to FIG. 8. By the same token, if the phone determines that the software version number stored in mobile phone is the same as the new software file currently being broadcast, the phone will not take any action to store the file increments being broadcast and simply ignore them.

Although the preferred embodiment of our invention describes the placing of broadcast download alert information into an alert TS and the placing of broadcast download payload information into an idle TS, our invention is not limited with respect to where the alert information or the payload information are placed in a frame. In an alternative embodiment, the alert information is placed in a first portion of an idle TS of a frame and the payload information is place in a second portion of an idle TS of the same frame. The key is for the mobile communications device to know where to look for the alert information and if this information indicates that a new software file is available to be loaded, then where to look for the payload information.

Figure 10A:
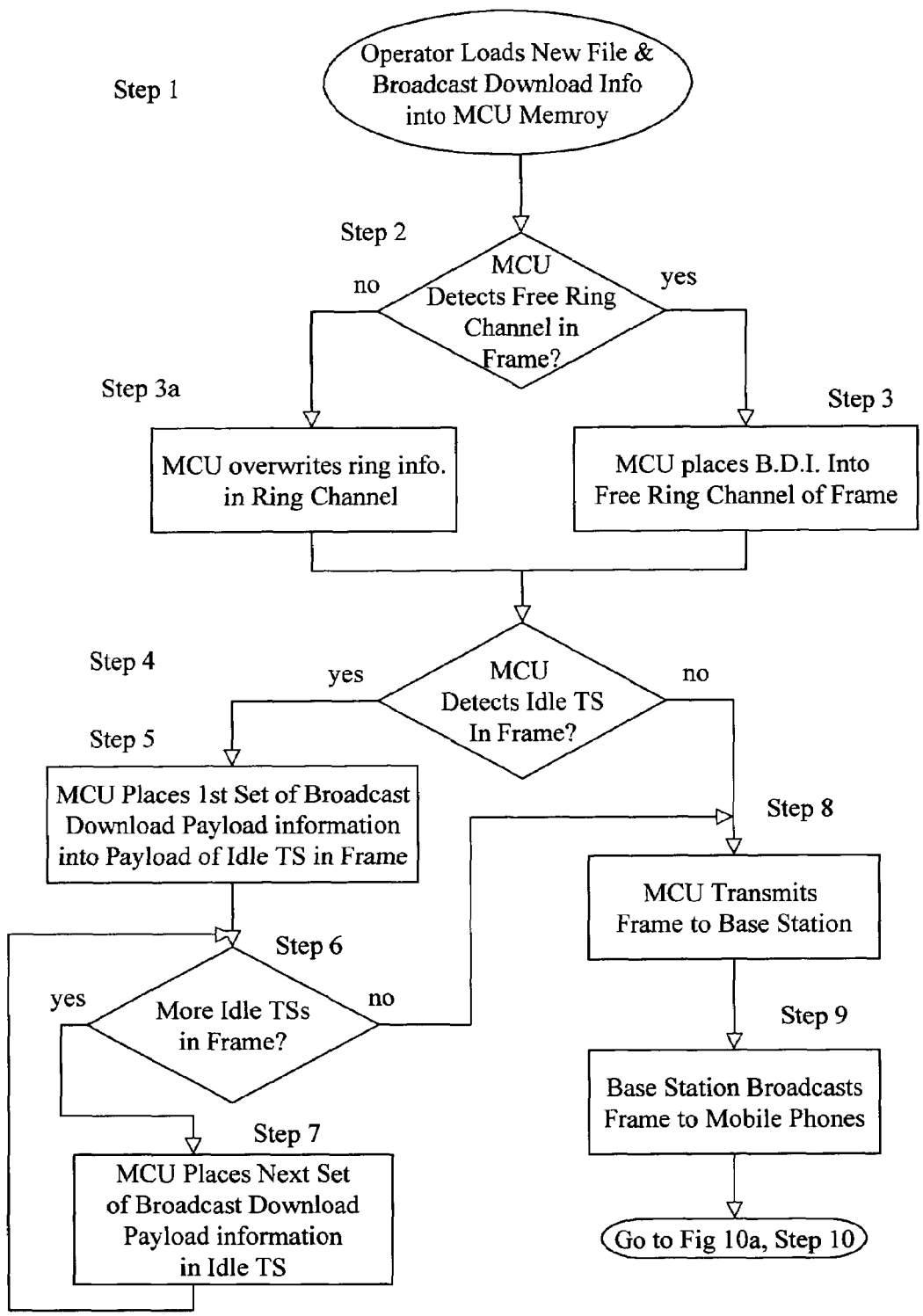
FIG. 10a is a logic flow diagram illustrating the down load process of our invention.
Figure 10B:
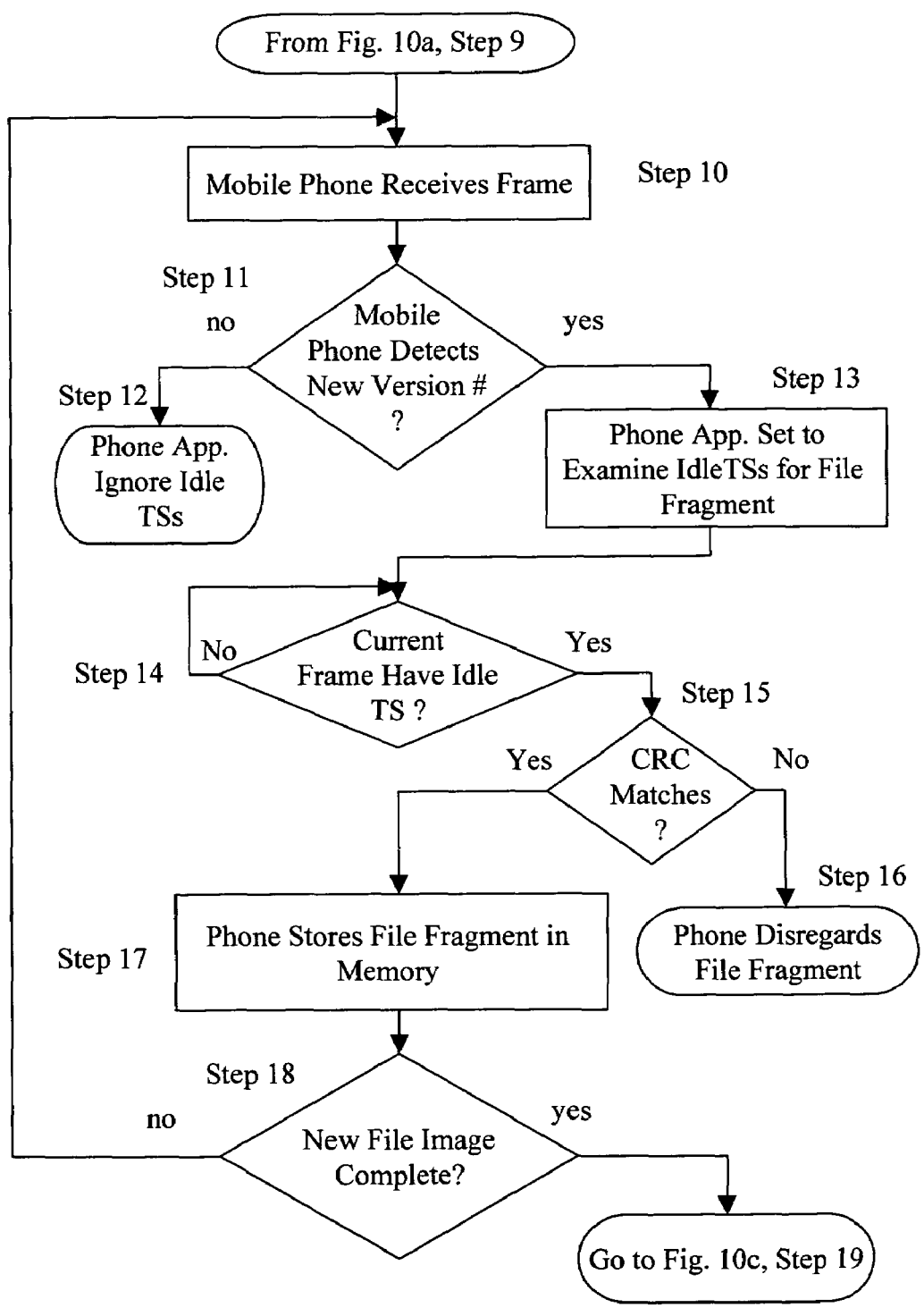
Figure 10C:
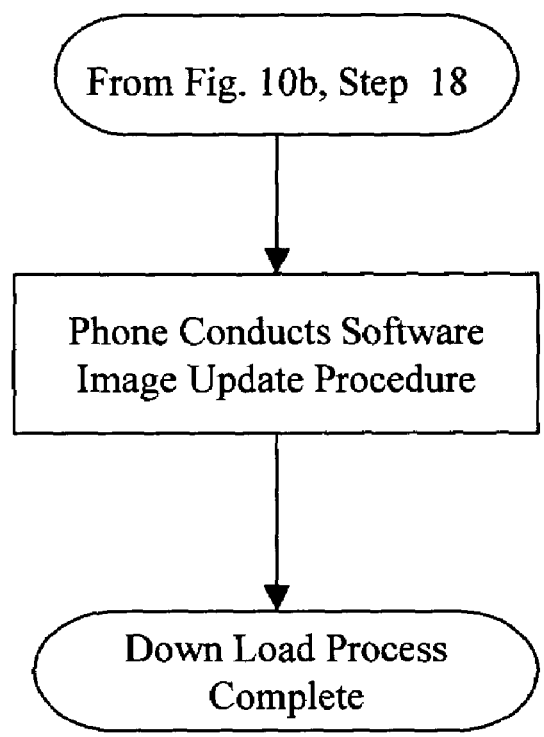
FIG. 10c is a continuation of the logical flow diagram of FIG. 10b.

With reference to FIGS. 10a, 10b, and 10c we will now describe the process used to load a new file image onto a plurality of mobile phones at the same time. Starting with FIG. 10a, at step 1, the system operator using the operator's console which is connected to the MCU over an RS232 interface initiates the loading of a new into the MCU memory 22 shown in FIG. 2. Once the new file is loaded into the MCU memory and if in step 2 the MCU detects a free ring channel in a TDMA frame, in step 3a the MCU places the broadcast download alert information described above with reference to FIG. 8 into the free ring channel, and in step 2 if the MCU does not detect a free ring channel it proceeds to step 3b where is simply overwrites alert information in one of the ring channels. At this point, in step 4 the MCU examines the same TDMA frame looking for downlink TSs following the ring TS that are idle in order to place broadcast download payload information containing a fragment address, a first new file fragment, and some CRC information into the payload field. If the MCU detects an idle downlink TS, then in step 5 it places broadcast download payload information into the payload field of TS format 90 of FIG. 9 for instance, and proceeds to examine the same frame for additional idle downlink TSs in step 6. If in step 6 the MCU detects another idle downlink TS, then in step 7 it places broadcast download payload information including a next fragment address, file fragment, and CRC into the payload field of the idle TS. The process loops between step 6 and step 7 until the MCU has detected all of the idle downlink TSs in a frame. If, on the other hand, the MCU does not detect another idle downlink time slot in the frame at step 6, then the process proceeds to step 8 where the MCU transmits the frame containing the broadcast download information and possibly a new file fragment to a base station, base station 11a of FIG. 1 for instance and the MCU process returns to step 2. The base station receives the frame of information and, as discussed with reference to FIG. 3, makes only minor modifications to the frame before, in step 9, broadcasting it over the air to mobile phones 10a and 10b for instance.

Now referring to FIG. 10b, if at least one of the mobile phones 10a or 10b is in call or standby mode, it could receive in step 10 the frame broadcast by the base station. At step 11, the phone examines the op code and from the op code determines that the rest of the information contained in this ring channel is a file version number and file size. Continuing to refer to step 11, if the phone detects that the version number is different from the version of the current software file which would typically be associated with a telephony application stored phone memory 43, in step 13 the phone application is set to store the contents of all subsequent idle TSs in this frame. If on the other hand, the phone does not detect a new software version number in the frame, the process will proceed to step 12 where the phone application will be set to ignore the contents of all subsequent idle TSs. In step 14, if the current frame received by the mobile phone contains at least one idle TS, the process proceeds to step 15. On the other hand, if the current frame received by the mobile phone has no idle TSs, the process loops on step 14 essentially waiting to receive a frame with at least one idle TS. At step 15, the mobile phone application examines the CRC associated with the file fragment contained in the idle TS and compares this CRC to a CRC stored in the mobile phone memory that corresponds to the fragment address of the file fragment. If the CRCs match, then at step 17 the mobile phone stores the file fragment in memory 42 of FIG. 4 at the fragment address associated with the file fragment. If, on the other hand, the CRCs do not match, then the phone simply discards the file fragment. At this point, in step 18 the mobile phone 10a compares the file size information contained in the TS zero ring channel and compares this to the size of the new software file already stored in the mobile phones memory 42 as discussed with reference to FIG. 4. In the event that this file size comparison indicates that not all of the new file fragments have been received, then the process returns to step 10. On the other hand, if the comparison in step 18 results in a determination that the new software file image is complete, the process proceeds to step 19 and the phone initiates a new software file image update procedure as described below with reference to FIG. 11.

Assuming that the complete new software file image is stored in memory 42 and the calculated CRC and the precalculated CRC match, the mobile phone proceeds to erase the old version of the software file image stored in memory 43 and load the new version of the software file image stored temporarily in memory 42 into memory 43 at the location specified by the packets addresses described previously with reference to FIG. 9. This file erase and replace operation is well know in the computer science field and so will not be described here with reference to FIG. 11 in great detail.

Figure 11:
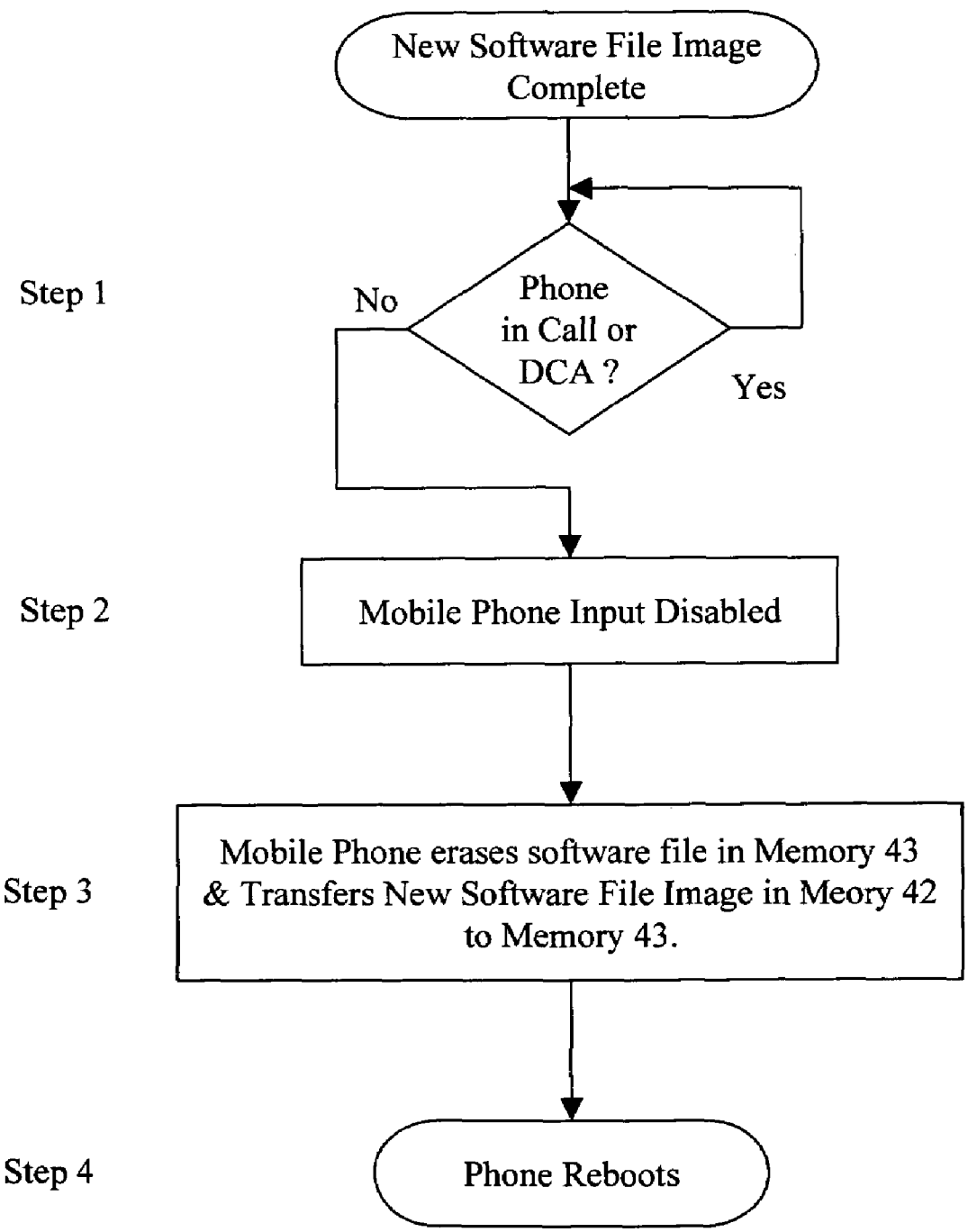
FIG. 11 is a logical flow diagram illustrating mobile phone memory update process of our invention.

In step 1 of FIG. 11 the mobile phone waits until it is not in call mode and in step 2, the mobile phone disables all external input and interrupts to the phone. In step 3, the phone proceeds to erase the current software file image from memory 43 and copies the new software file image from memory 42 into memory 43. Once the file transfer is complete, in step 4 the mobile phone reboots running the new software file. At this point the process returns to FIG. 10b and in step 20, the phone becomes operational again and will accept external input and interrupts initiated by a user, for instance.

Although we have described particular embodiments of our invention, it should be understood that we are not limiting where in a frame the download alert information or the download payload information are placed and we are not limiting our invention to only being placed in frames that do not carry any audio, management information or other information and we are not limiting our invention to broadcasting the new file fragments in any particular order. Indeed, this alert and payload information could be placed in any frame as long as such placement does not have an adverse affect on the performance of the communications system and the file fragments could be broadcast in any order as they will all be placed in the mobile communications device memory according to the fragment addresses associated with each file fragment.

We claim:

1. In a wireless communications network including a multipoint control unit, a base station and a plurality of mobile communications devices associated with the base station, at least one of the plurality of mobile communication devices being in a call mode, a method of replacing a current software file in the plural mobile communications devices with a new software file comprising the steps of:

the multipoint control unit placing a broadcast download opcode, file version information and file size information into an alert time slot in a frame;

the multipoint control unit placing broadcast download payload information into an idle time slot in the frame and transmitting the frame to the base station;

the base station receiving the frame from the multipoint control unit and broadcasting the frame to all of the plural mobile communications devices associated with the base station;

the at least one of the plurality of mobile communications devices being in the call mode receiving the frame broadcast by the base station, detecting the download opcode, storing the file size information and comparing the file version information contained in the alert time slot of the frame with a current file version information stored in a first memory of the mobile communications device; and the mobile communications device storing the broadcast download payload information contained in the idle time slot of the frame in a second memory of the mobile communications device at a location specified by the broadcast download payload information if the file version information contained in the alert time slot of the frame and the current file version information stored in the first memory of the mobile communications device are not the same.

2. The method of claim 1 wherein the file version information is a version number.

3. The method of claim 1 wherein the file size information is the number of file fragments contained in a complete new software file.

4. The method of claim 1 wherein the broadcast download payload information is comprised oft least one or more payload characteristics.

5. The method of claim 4 wherein the payload characteristics are a fragment address, new file fragment, and cyclic redundancy check information.

6. The method of claim 1 wherein the mobile communications devices are mobile phones.

7. The method of claim 1 wherein the step of the mobile communications device storing a new software file fragment in a memory location specified by the broadcast download payload information, if the current file version information and the file version information contained in the frame sent by the base station are not the same, further comprises:

the cycle redundancy check payload characteristic and a cycle redundancy check calculated for the new software file fragment by the wireless communications device are the same.

8. The method of claim 1 wherein the step of verifying the accuracy of the new software file comprises:

the mobile communications device determining that the cyclic redundancy check stored in the last new file fragment and the cyclic redundancy check for the entire new software file that is calculated by the mobile communications device are the same.

9. The method of claim 1 wherein the alert time slot is a time slot that contains a ring channel.

10. The method of claim 1 wherein the idle time slot is a time slot that contains no audio or data payload information.

11. In a wireless communications network including a multipoint control unit, a base station and a plurality of mobile communications devices associated with the base station, at least one of the plurality of mobile communication devices being in a call mode, a method of replacing a current software file in the plural mobile communications devices with a new software file comprising the steps of:

the multipoint control unit placing a broadcast download opcode, file version information and file size information into an idle time slot of a first portion of a frame;

the multipoint control unit placing broadcast download payload information into an idle time slot of a second portion of the frame and transmitting the frame to the base station;

the base station receiving the frame from the multipoint control unit and broadcasting the frame to all of the plural mobile communications devices associated with the base station;

the at least one of the plurality of mobile communications devices being in the call mode receiving the frame broadcast by the base station, detecting the download opcode, storing the file size information and comparing the file version information contained in the contained in the idle time slot of a first portion of a frame with a current file version information stored in a first memory of the mobile communications device; and the mobile communications device storing the broadcast download payload information contained in the idle time slot of the second portion of the received frame in a second memory of the mobile communications device at a location specified by the broadcast download payload information if the file version information contained in the broadcast download alert information and the current file version information are not the same.

12. The method of claim 11 wherein the file version information is a version number.

13. The method of claim 11 wherein the file size information is the number of file fragments contained in a complete new software file.

14. The method of claim 11 wherein the broadcast download payload information is comprised of at least one or more payload characteristics.

15. The method of claim 14 wherein the payload characteristics are a fragment address, new file fragment and cyclic redundancy check information.

16. The method of claim 11 wherein the mobile communication devices are mobile phones.

17. The method of claim 11 wherein the step of the mobile communications device storing a new software file fragment in a memory location specified by the broadcast download payload information, if the current file version information and the file version information contained in the frame sent by the base station are not the same, further comprises:

the cycle redundancy check payload characteristic and a cycle redundancy check calculated for the new software file fragment by the wireless communications device are the same.

18. The method of claim 11 wherein the step of verifying the accuracy of the new software file comprises:

the mobile communications device determining that the cyclic redundancy check stored in the last new file fragment and the for the entire new software file that is calculated by the mobile communications device are the same.

19. The method of claim 11 wherein the alert time slot is a time slot that contains a ring channel.

20. The method of claim 11 wherein the idle time slot is a time slot that contains no audio or data payload information.

* * * * *